(12) United States Patent
Corfield (10) Patent No.: US 10,643,616 B1
(45) Date of Patent: *May 5, 2020

(54) APPARATUS AND METHODS FOR DYNAMICALLY CHANGING A SPEECH RESOURCE BASED ON RECOGNIZED TEXT

(71) Applicant: nVoq Incorporated, Boulder, CO (US)

(72) Inventor: Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,553

(22) Filed: Apr. 11, 2018

Related U.S. Application Data (63) Continuation-in-part of application No. 15/805,456, filed on Nov. 7, 2017, now abandoned, which is a continuation of application No. 14/638,619, filed on Mar. 4, 2015, now Pat. No. 9,812,130.

(60) Provisional application No. 61/951,400, filed on Mar. 11, 2014.

(51) Int. Cl.
| | |
|---|---|
| *G10L 15/26* | (2006.01) |
| *G10L 15/18* | (2013.01) |
| *G10L 15/197* | (2013.01) |
| *G10L 15/183* | (2013.01) |

(52) U.S. Cl.
CPC ............ *G10L 15/26* (2013.01); *G10L 15/18* (2013.01); *G10L 15/183* (2013.01); *G10L 15/197* (2013.01)

(58) Field of Classification Search
CPC ...... G10L 15/26; G10L 15/183; G10L 15/197
USPC ........................................ 704/235, 251, 257
See application file for complete search history.

(56) References Cited

U.S. PATENT DOCUMENTS

| | | | | |
|---|---|---|---|---|
| 6,513,003 B1* | 1/2003 | Angell | ............ | H04L 29/06027 704/235 |
| 8,606,581 B1* | 12/2013 | Quast | ............... | G10L 15/32 704/254 |
| 8,612,211 B1* | 12/2013 | Shires | ............... | G06F 17/27 704/10 |
| 8,630,860 B1* | 1/2014 | Zhang | ............ | G06F 17/30026 704/235 |
| 8,666,728 B2* | 3/2014 | Rigazio | ............... | G06F 3/0237 704/9 |
| 9,047,868 B1* | 6/2015 | O'Neill | .............. | G10L 15/197 |
| 9,324,323 B1* | 4/2016 | Bikel | ............... | G10L 15/183 |
| 9,401,146 B2 | 7/2016 | Sharifi | | |
| 9,552,354 B1* | 1/2017 | Seligman | .......... | G06F 17/2755 |
| 9,953,634 B1* | 4/2018 | Pearce | ............... | G10L 15/063 |
| 2002/0069065 A1* | 6/2002 | Schmid | ............... | G10L 13/04 704/270 |
| 2002/0087315 A1* | 7/2002 | Lee | ...................... | G06Q 30/06 704/9 |
| 2004/0088162 A1* | 5/2004 | He | ...................... | G10L 15/063 704/235 |
| 2006/0100876 A1* | 5/2006 | Nishizaki | ............ | G10L 15/32 704/257 |
| 2006/0149558 A1* | 7/2006 | Kahn | ............... | G10L 15/063 704/278 |

(Continued)

*Primary Examiner* — James S Wozniak
(74) *Attorney, Agent, or Firm* — Perkins Coie LLP (57) ABSTRACT

The technology of the present application provides a method and apparatus to manage speech resources. The method includes using a text recognizer to detect a change in a speech application that requires the use of different resources. On detection of the change, the method loads the different resources without the user needing to exit the currently executing speech application.

14 Claims, 6 Drawing Sheets

(56) References Cited

U.S. PATENT DOCUMENTS

| | | | |
|---|---|---|---|
| 2006/0212295 A1* | 9/2006 | Wasserblat | G10L 25/48 704/252 |
| 2007/0100618 A1* | 5/2007 | Lee | G10L 15/1822 704/238 |
| 2007/0294081 A1* | 12/2007 | Wang | G10L 15/26 704/200 |
| 2008/0177545 A1* | 7/2008 | Li | G06F 17/271 704/255 |
| 2008/0221881 A1* | 9/2008 | Carraux | G10L 15/22 704/235 |
| 2009/0030698 A1* | 1/2009 | Cerra | G10L 15/30 704/275 |
| 2009/0043581 A1* | 2/2009 | Abbott | G10L 15/187 704/254 |
| 2009/0099763 A1* | 4/2009 | Muramatsu | G01C 21/36 704/8 |
| 2009/0113293 A1* | 4/2009 | Schubert | G06F 17/24 715/256 |
| 2009/0271195 A1* | 10/2009 | Kitade | G10L 15/065 704/239 |
| 2010/0030560 A1* | 2/2010 | Yamamoto | 704/257 |
| 2010/0185448 A1* | 7/2010 | Meisel | G10L 15/22 704/256.1 |
| 2011/0004462 A1* | 1/2011 | Houghton | G10L 15/183 704/9 |
| 2011/0055256 A1* | 3/2011 | Phillips | G10L 15/30 707/769 |
| 2011/0077943 A1* | 3/2011 | Miki | G10L 15/183 704/250 |
| 2011/0144999 A1* | 6/2011 | Jang | G06K 9/00892 704/270.1 |
| 2011/0224981 A1* | 9/2011 | Miglietta | G10L 15/26 704/235 |
| 2012/0053935 A1* | 3/2012 | Malegaonkar | G10L 15/07 704/235 |
| 2012/0059658 A1* | 3/2012 | Sejnoha | G06F 17/30864 704/270 |
| 2013/0018650 A1* | 1/2013 | Moore | G06F 17/2818 704/9 |
| 2013/0030804 A1* | 1/2013 | Zavaliagkos | G10L 15/26 704/235 |
| 2013/0080161 A1* | 3/2013 | Iwata | G10L 15/24 704/231 |
| 2013/0110492 A1* | 5/2013 | McGraw | G10L 15/08 704/2 |
| 2013/0238329 A1* | 9/2013 | Casella dos Santos | G06F 19/3487 704/235 |
| 2013/0289996 A1* | 10/2013 | Fry | G10L 15/32 704/257 |
| 2014/0012568 A1* | 1/2014 | Caskey | G06F 17/276 704/9 |
| 2014/0039893 A1* | 2/2014 | Weiner | G06F 3/167 704/249 |
| 2014/0108018 A1* | 4/2014 | Phillips | G06F 17/275 704/275 |
| 2014/0136210 A1* | 5/2014 | Johnston | G10L 15/07 704/275 |
| 2014/0163977 A1* | 6/2014 | Hoffmeister | G10L 15/32 704/232 |
| 2014/0214429 A1* | 7/2014 | Pantel | G10L 21/16 704/275 |
| 2014/0278411 A1* | 9/2014 | Cheung | G10L 15/18 704/240 |
| 2014/0365200 A1* | 12/2014 | Sagie | G06F 17/289 704/2 |
| 2014/0379346 A1* | 12/2014 | Aleksic | G10L 15/25 704/251 |
| 2015/0058018 A1* | 2/2015 | Georges | G10L 15/08 704/257 |
| 2015/0185964 A1* | 7/2015 | Stout | H04N 5/44513 715/716 |
| 2015/0278194 A1* | 10/2015 | Terao | G06N 7/005 704/9 |
| 2015/0279365 A1* | 10/2015 | Sharifi | G10L 15/26 704/235 |
| 2015/0370780 A1* | 12/2015 | Wang | G06F 17/276 704/9 |
| 2016/0027439 A1* | 1/2016 | Sharifi | G10L 15/22 704/235 |
| 2016/0155436 A1* | 6/2016 | Choi | G10L 15/183 704/232 |
| 2017/0186432 A1* | 6/2017 | Aleksic | G10L 15/07 |
| 2018/0096678 A1* | 4/2018 | Zhou | G10L 15/32 |
| 2018/0137857 A1* | 5/2018 | Zhou | G10L 15/02 |

* cited by examiner

APPARATUS AND METHODS FOR DYNAMICALLY CHANGING A SPEECH RESOURCE BASED ON RECOGNIZED TEXT

CLAIM OF PRIORITY UNDER 35 U.S.C. §§ 119 AND 120

The present patent application is a continuation-in-part of U.S. Non-Provisional application Ser. No. 15/805,456, filed Nov. 7, 2017, which is a continuation of U.S. Non-Provisional application Ser. No. 14/638,619, filed on Mar. 4, 2015 (now U.S. Pat. No. 9,812,130), which claims priority to U.S. Provisional Patent Application Ser. No. 61/951,400, filed Mar. 11, 2014, the disclosure of which is incorporated herein by reference as if set out in full.

REFERENCE TO CO-PENDING APPLICATIONS FOR PATENT

The present application is related to U.S. patent application Ser. No. 13/495,406, titled Apparatus and methods for managing resources for a system using voice recognition, filed Jun. 13, 2012, the disclosure of which is incorporated herein by reference as if set out in full.

BACKGROUND

Field

The technology of the present application relates generally to speech recognition systems, and more particular, to apparatuses and methods to allow for dynamically changing application resources, such as a language model, while using speech recognition to generate text.

Background

Speech (or voice) recognition and speech (or voice) to text engines such as are available from Microsoft, Inc., are becoming ubiquitous for the generation of text from user audio or audio from text. The text may be used to generate word documents, such as, for example, this patent application, or populate fields in a user interface and/or database, such as an Electronic Health Record or a Customer Relationship Management Database, or the like. Conventionally, the speech recognition systems are machine specific. The machine includes the language model, speech recognition engine, and user profile for the user (or users) of the machine. These conventional speech recognition engines may be considered thick or fat clients where a bulk of the processing is accomplished on the local machines. Generally, once actively engaged with a speech recognition system, the system is locked to a single user and a single language model.

More recently, companies such as nVoq Incorporated located in Boulder, Colo. have developed technology to provide a distributed speech recognition system using the Cloud. In these cases, the audio file of the user is streamed or batched to a remote processor from a local device. The local device may be a workstation, conventional telephone, voice over internet protocol telephone (VoIP), cellular telephone, smartphone, handheld device, or the like. The remote processor performs the conversion (speech to text or text to speech) and returns the converted file to the user. For example, a user at a desktop computer may produce an audio file that is sent to a speech to text device that returns a Word document to the desktop. In another example, a user on a mobile device may transmit a text message to a text to speech device that returns an audio file that is played through the speakers on the mobile device. In some embodiments, the returned file (audio or text) may be stored for later retrieval, similar to a batch system, or sent to a user account, such as, e-mail or the like.

As speech recognition becomes more commonplace and robust, clients will use speech recognition in multiple settings, such as, for example, job related tasks, personal tasks, or the like. As can be appreciated, the speech resources used for the various tasks may be different. Even in a job setting, the speech resources for various tasks may vary drastically. For example, a client may transcribe documents for medical specialties such as cardiovascular surgery and metabolic disorders. The speech resource to transcribe the audio file to the text file, shortcuts, and user profiles for the vastly different, but related, transcriptions require the client to have different speech resources to effectively use speech recognition. Conventionally, to have access to different speech resources, a client would need a completely separate account and identification. To change accounts, the client would need to close out of the first account and logon to the second account, which is tedious and time consuming. Moreover, commands to change speech resources are difficult to convey in conventional computing systems as speech recognition engines have a difficult time distinguishing between dictation audio and command audio.

Thus, against this background, it is desirable to develop improved apparatuses and methods for dynamically changing application resources, and specifically speech resources, for speech recognition engines.

SUMMARY

To attain the advantages, and in accordance with the purpose of the technology of the present application, methods and apparatus to allow speech applications to load speech resources specific to the application without the need for a client to terminate an existing logon are provided. In particular, the method, apparatus, and system provides data from a client workstation regarding a first speech application and a first set of speech resources being used by the first speech application, such as, for example, a user name and account. Audio, whether a streamed audio or a batch audio, is received from the client workstation and converted to text by the speech recognition engine using the first set of speech resources, which includes first resources to convert the audio file to a text file. A text recognizer compares the text to a database of triggers, which triggers may include words, clauses, or phrases. The text recognizer, on textually recognizing the trigger, sends a command to the speech recognition engine to dynamically replace the first set of speech resources, which may include a the first resources, with the second set of speech resources, which may include a second speech resource to convert the audio file to a text file, and to convert the audio to text using the second set of speech resources.

In certain aspects, the speech resources relate to dictation resources for a natural language processor. In some embodiments, the speech resources may include a plurality of language models. In other aspects, the speech resources may include shortcuts and inserts for use by the system to make transcriptions.

In other aspects, the apparatus may pause (or cache) the audio when the text recognizer recognizes a trigger. The speech to text engine will begin using a second speech resources to convert the audio file to the text file based on the trigger. Once the second speech resource is loaded, the apparatus will resume feeding the audio to the speech recognition engine. In other aspects, the apparatus will both pause the audio and repoint the audio to the first utterance after the trigger, using a tag or index in the audio that corresponds to the text string. This effectively re-winds the audio to the point where the speech resource to convert the audio file to the text file should have been switched.

The foregoing and other features, utilities and advantages of the invention will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

The technology of the present application will now be explained with reference to the figures. While the technology of the present application is described with relation to a speech recognition system using natural language or continuous speech recognition, one of ordinary skill in the art will recognize on reading the disclosure that other configurations, such as speech recognition using neural nets, are possible. Moreover, the technology of the present application will be described with reference to discrete processors, modules, or parts, but one of ordinary skill in the art will recognize on reading the disclosure that processors may be integrated into a single processor or server or separated into multiple processors or servers. Moreover, the technology of the present application will be described generically and portions of the present application may be loaded onto a user's workstation (fat or thick client) or hosted by a server that is accessed by the workstation (thin client). Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated.

Conventionally, speech recognition systems may be considered isolated applications of a speech system (whether a thick or thin application). In other words, when a user invokes or launches a speech recognition application, the system loads or accesses the speech resources to convert the audio file a text file, such as, for example, neural nets, or a language model and user profile associated with the unique user identification or with that deployment of the speech recognition software, hardware, or combination thereof. As speech recognition becomes ubiquitous, however, individuals may have multiple uses for the speech recognition. The uses may be related, but typically they will differ in the specific speech resource used.

It has been found, however, that the more tailored a speech resource is to the relevant speech, the more robust the recognition engine. In certain instances, for example, a natural language speech recognition engine may not require a user profile if the language model is sufficiently correlated to the audio or speech predicted. Conventionally, the speech resource to convert the audio file to a text file, such as a neural net or a language model tied to a user profile, is anchored too the invoked use and the speech resource cannot be updated as the user moves to different tasks. Thus, for example, an electronic health record currently provides a user with a single speech resource for dictation/transcription services. However, certain fields of the electronic health record may require generic language application such that the patient can describe symptoms and specific medical application for specific disorders or the like, such as metabolic or neurologic disorders. The speech recognition engine would function more efficiently (e.g., with generally better accuracy) if the speech resource to convert the audio file to the text file could be updated for the various specific applications as the patient, doctor, or healthcare provider moves through the electronic health record.

The different tasks or fields associated with the user will generally require a new set of resources. Most specifically, the new set of resources will include a change of a tool to convert the audio file to the text file, such as, for example, a neural net or language model, but may include other functionality such as, for example, new shortcuts, a new (or at least different) user profile, and the like (generically referred to as resources). Under current models, to obtain such new resources and functionality, the user must close out of an existing operation and reopen the speech recognition application using different information, such as a different user profile identification, to allow access to different resources and functionality. Continually shutting down and reopening an application is tedious and time consuming. Additionally, the accuracy increases by changing language models typically is outweighed by the time lost in the process.

The technology of the present application, therefore, provides a distributed speech recognition system that allows a user or administrator to manage resources dynamically and seamlessly. Additionally, the technology of the present application provides a mechanism to allow a user to navigate between resources using voice commands. In certain applications, the speech recognition system may identify a resource and load appropriate resources in lieu of being commanded to do so.

Figure 1:
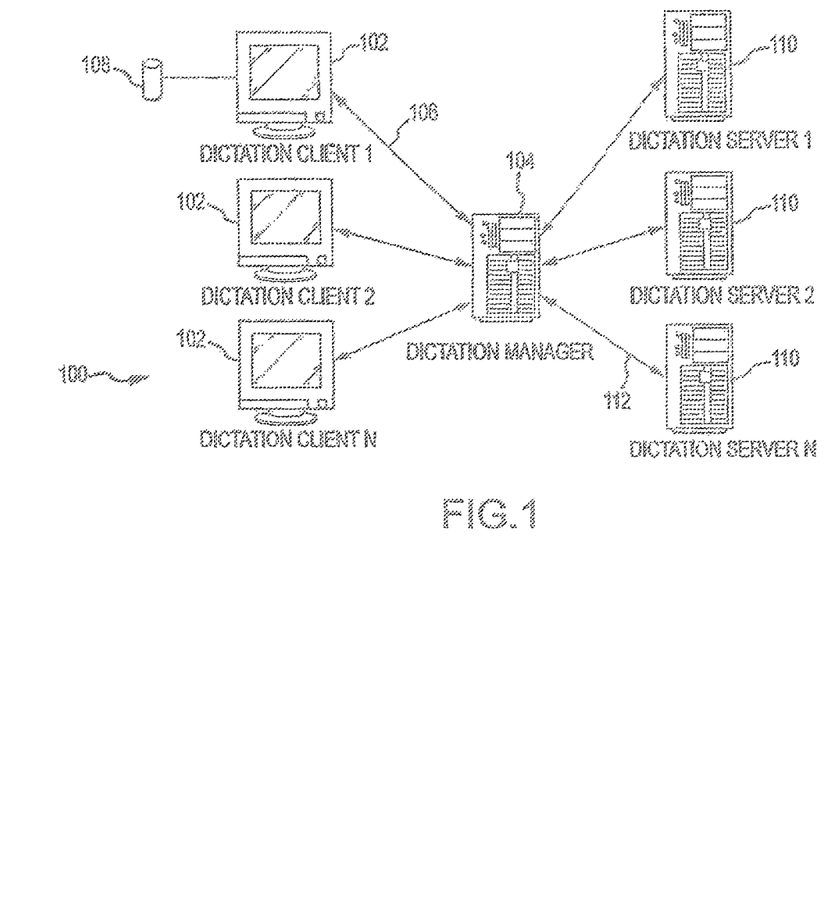
FIG. 1 is a functional block diagram of a distributed speech recognition system consistent with the technology of the present application.

Now with reference to FIG. 1, a distributed speech recognition system 100 is shown. Distributed speech recognition system 100 may provide transcription of dictation in real-time or near real-time allowing for delays associated with transmission time, processing, and the like. Of course, delay could be built into the system to allow, for example, a user the ability to select either real-time or batch transcription services. In this exemplary embodiment, distributed speech recognition system 100 includes one or more client stations 102 (dictation clients 1-*n*) that are connected to a dictation manager 104 by a first network connection 106. For non-speech recognition resources, dictation manager 104 may be generically referred to as a resource manager. First network connection 106 can be any number of protocols to allow transmission of data or audio information, such as, for example, using a standard internet protocol. In certain exemplary embodiments, the first network connection 106 may be associated with a "Cloud" based network. As used herein, a Cloud based network or Cloud computing is generally the delivery of computing, processing, or the like by resources connected by a network. Typically, the network is an internet based network but could be any public or private network. The resources may include, for example, both applications and data. A conventional cloud computing system will be further explained herein below with reference to FIG. 2. With reference back to FIG. 1, client station 102 receives audio for transcription from a user via a microphone 108 or the like. While shown as a separate part, microphone 108 may be integrated into client station 102, such as, for example, a cellular phone, tablet computer, or the like. Also, while shown as a monitor with input/output interfaces or a computer station, client station 102 may be a wireless device, such as a WiFi enabled computer, a cellular telephone, a PDA, a smart phone, or the like.

Dictation manager 104 is connected to one or more dictation services hosted by dictation servers 110 (dictation servers 1-*n*) by a second network connection 112. Similarly to the above, dictation servers 110 are provided in this exemplary distributed speech recognition system 100, but resource servers may alternatively be provided to provide access to functionality other than speech recognition, which includes both speech to text services and text to speech services in some aspects. Second network connection 112 may be the same as first network connection 106, which may be a cloud computing system also. Dictation manager 104 and dictation server(s) 110 may be a single integrated unit connected by a bus, such as a PCI or PCI express protocol. Each dictation server 110 incorporates or accesses a speech resource to convert an audio file (from client station 102) into a text file. In certain aspects the dictation server 110 may include a natural language or continuous speech recognition engine as is generally understood in the art. In other embodiments, the dictation server 110 may include neural networks. In operation, the dictation manager 104 receives an audio file for transcription from a client station 102. Dictation manager 104 selects an appropriate dictation server 110, using conventional load balancing or the like, and transmits the audio file to the dictation server 110. In certain embodiments, the dictation manager 104 may select the dictation server 110 based on the speech resource used to convert the audio file to the text file. The dictation server 110 would have a processor that uses the appropriate algorithms to transcribe the speech, such as, for example, using a natural language or continuous speech to text processor. In some instances, the dictation manager 104 uploads a user profile to the dictation server 110 and the processing algorithms include an appropriate language model. The user profile, as explained above, modifies the speech to text processor for the user's particular dialect, speech patterns, or the like based on conventional training techniques. The language model is tailored for the expected language. A data or text file created from the audio is returned to the client station 102 once transcribed by the dictation server 110. In certain instances, the data or text file may be created as the data or text is processed from the audio such that speaking "I am dictating a patent application" will display on a monitor of the speaker's workstation as each word is converted to text. Alternatively, the transcription or data file may be saved for retrieval by the user at a convenient time and place.

As mentioned above, the dictation server 110 conventionally would be loaded with a single instance of a speech resource, such as, for example, a single language profile for use with the identified user profile or client account, or alternatively a neural network, to convert the audio from the user to text. As recognized by the present application, a single instance of a speech resource for a speech recognition engine may not be sufficiently robust. Thus, the technology of the present application provides the speech recognition engine with access to a plurality instance of differently configured speech resources, such as, for example, a plurality of language models or a plurality of neural networks. For ease of reference, the plurality of language models, or alternatively the plurality of neural networks, may be referred to as a resource, a speech resource, or a set of resources. Different resources models may be distinguished by, for example, indicating a first resource and a second resource.

Figure 2:
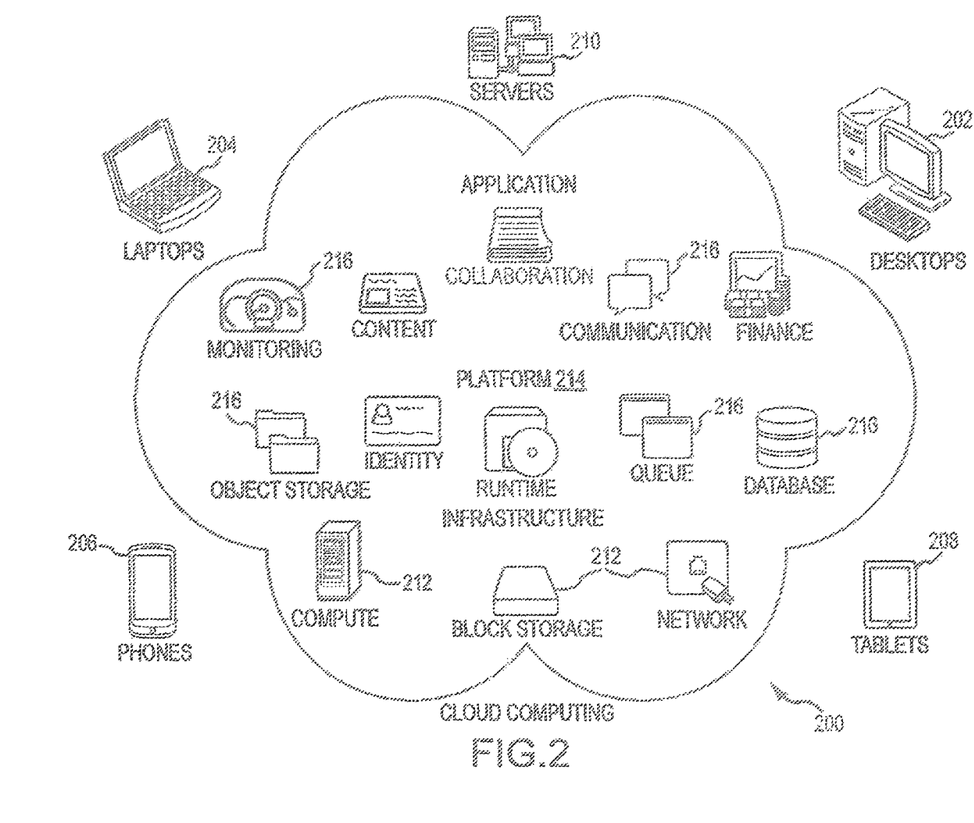
FIG. 2 is a functional block diagram of a cloud computing network consistent with the distributed speech recognition system of FIG. 1.

Referring now to FIG. 2, the basic configuration of a cloud computing system 200 will be explained for completeness as the technology of the present application may be used in a cloud computing environment. Cloud computing is generally understood in the art, and the description that follows is for furtherance of the technology of the present application. As provided above, cloud computing system 200 is arranged and configured to deliver computing and processing as a service of resources shared over a network. Clients access the Cloud using a network browser, such as, for example, Internet Explorer® from Microsoft, Inc. for internet based cloud systems. The network browser may be available on a processor, such as a desktop computer 202, a laptop computer 204 or other mobile processor such as a smart phone 206, a tablet 208, or more robust devices such as servers 210, or the like. As shown, the cloud may provide a number of different computing or processing services including infrastructure services 212, platform services 214, and software services 216. Infrastructure services 212 may include physical or virtual machines, storage devices, and network connections. Platform services 214 may include computing platforms, operating systems, application execution environments, databases, and the like. Software services 216 may include applications accessible through the cloud such as speech-to-text engines and text-to-speech engines and the like.

Figure 3:
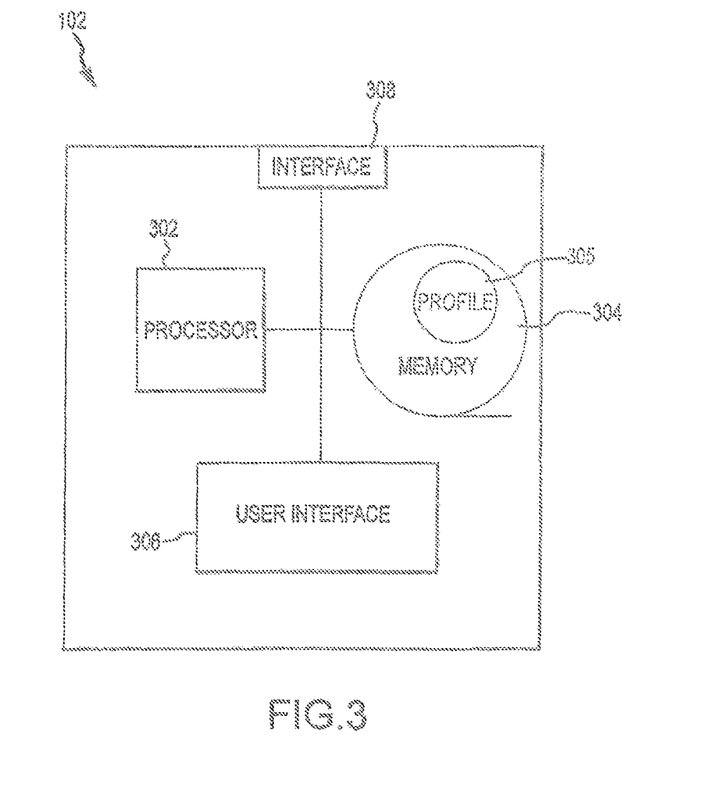
FIG. 3 is a functional block diagram of a computing device consistent with the technology of the present application.

Referring to FIG. 3, client station 102 (which may be referred to as a dictation station, client dictation station, or the like) is shown in more detail. As mentioned above, the client station 102 may include a laptop computer, a desktop computer, a server, a mobile computing device, a handheld computer, a PDA, a cellular telephone, a smart phone, a tablet or the like. The client station 102 includes a processor 302, such as a microprocessor, chipsets, field programmable gate array logic, or the like, that controls the major functions of the client station 102, such as, for example, obtaining a user profile with respect to a user of client station 102 or the like. Processor 302 also processes various inputs and/or data that may be required to operate the client station 102. The client station 102 also includes a memory 304 that is interconnected with processor 302. Memory 304 may be remotely located or co-located with processor 302. The memory 304 stores processing instructions to be executed by processor 302. The memory 304 also may store data necessary or convenient for operation of the distributed speech recognition system 100. For example, memory 304 may store the audio file for the client so that the audio file may be processed later. A portion of memory 304 may include speech resources 305 associated with user(s) workstation 102. The memory 304 also may include the plurality of speech resources to convert an audio file to a text file, such as, for example, a plurality of language models or a plurality of neural networks that may be need to be accessed for the user during the conversion of the user audio to text, which speech resources may be associated with a specific user as identified below. The user(s) may have multiple speech resources allocated or assigned to the user depending on the tasks the user is performing. The speech resources 305, which may include user profiles and the plurality of language models, also may be stored in a memory associated with dictation manager 104 or dictation servers 110 in a distributed system. In this fashion, the speech resources may be uploaded to the processor that requires the plurality of resources for a particular functionality. Also, this would be convenient for systems where the users may change workstations 102.

The plurality of speech resources to covert the audio file to the text file may be associated with individual users by a pass code, user identification number, biometric information or the like and is usable by dictation servers 110 to facilitate the speech transcription engine in converting the audio to text. Associating users and speech resources using a database or relational memory is not further explained except in the context of the present application as linking fields in a database is generally understood in the art. Memory 304 may be any conventional media and may include either or both volatile or nonvolatile memory. The client station 102 generally includes a user interface 306 that is interconnected with processor 302. Such user interface 306 could include speakers, microphones, visual display screens, physical input devices such as a keyboard, mouse or touch screen, track wheels, cams, optical pens, special input buttons, etc. to allow a user to interact with the client station 102. The interface 306 may include a graphical user interface. The client stations 102 have a network interface 308 (as would the dictation manager and the dictation server of this exemplary embodiment) to allow transmissions and reception of data (text, audio, or the like). Dictation manager 104 and dictation servers 110 may have structure similar to the client station 102 described herein.

Additionally, while the various components are explained above with reference to a cloud, the various components necessary for a speech recognition system may be incorporated into a single client station 102. When incorporated into a single client station 102, the dictation manager may be optional or the functionality of the dictation manager may be incorporated into the processor as the dictation server and speech to text/text to speech components are the components associated with the invoked application.

Figure 4:
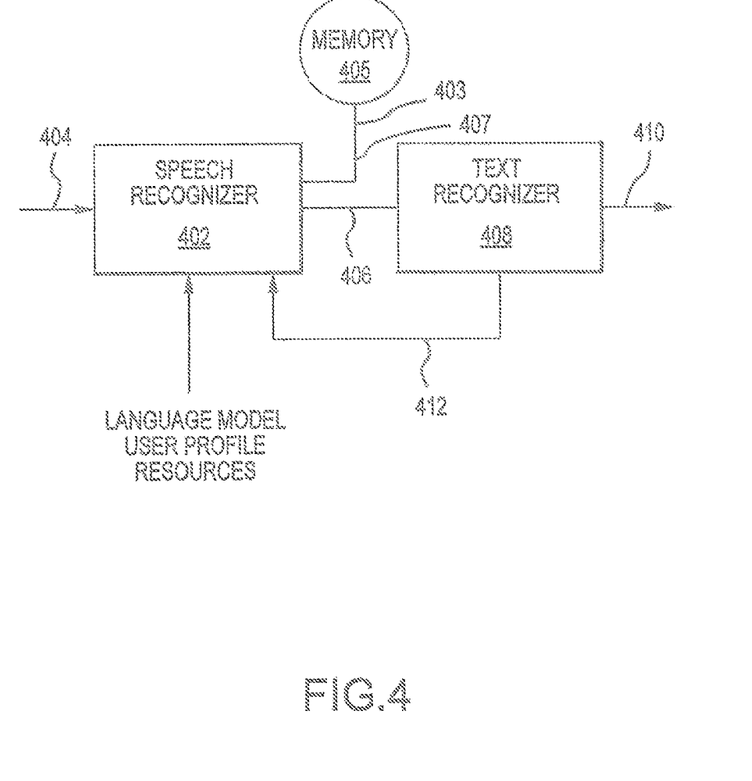
FIG. 4 is a functional block diagram of an apparatus consistent with the technology of the present application.

As shown in FIG. 4, in certain aspects of the present technology, the dictation server 110 will include a speech recognizer 402, such as is available from Microsoft, Inc., International Business Machines, Inc., or the like. The speech recognizer 402 may be referred to as a speech recognizer or speech engine. The speech recognizer 402 receives audio 404 as an input. The speech recognizer 402 is loaded with an initial or first speech resource that will convert the audio file to a text file when a user accesses the speech recognizer 402 to process the audio 404. The initial or first speech resource (or any loaded speech resource) may be referred to as the first speech resource as will be clear from the below. The first speech resource may be loaded based on the initial logon of a user to the distributed speech recognition system 100. In some embodiments, the first speech resource may be a default speech resource.

The speech recognizer 402 uses the speech resource to process the audio 404 and output interim text 406. The audio 402 as processed by the speech recognizer may be indexed with marks 403 and the interim text 406 may be indexed with tags 407. The marks 403 and tags 407 are correlated such that words spoken in the audio and the words transcribed in the text may be matched, ideally in a word for word manner although different word intervals or time stamps may be used to name but two alternative correlating methods. For example, pauses between utterances indicative of one clause to the next may be used to mark an audio segment. The marks 403 and tags 407 may be associated with endpointing metadata generated by the speech recognizer 402 as it processes the audio 404 and outputs the interim text 406.

Generally, the audio marks 403 and the text tags 407 are generated by the speech recognizer taking a large audio file and splitting the large audio file into a plurality of small audio files. Each of the plurality of small audio files is transcribed by the speech recognizer into a corresponding small text file (which is a one to one correspondence). Each of the small audio files and corresponding small text files may be called a text and audio pair. The text at this stage is generally true text or verbatim text. The plurality of small text files are normalized and concatenated into a final text file in most cases. The plurality of small audio files and the plurality of small text files may be stored in a memory such as memory 405 along with the audio marks 403 and the text tags 407.

The interim text 406 is received as an input by a text recognizer 408. The text recognizer 408 includes a memory or has access to a memory, such as memory 405, associated with the dictation server 110 containing keys or triggers, which may be words, phrases, or clauses. Each of the one or more triggers is linked to a speech resource useful for converting audio to text, or more generically a resource for operation of the application. While each trigger should be linked to a single language model, any particular language model may be linked to multiple triggers. As the interim text 406 is input to the text recognizer 408, the text recognizer determines whether any of the interim text 406 is a trigger by using conventional text recognition techniques, which include for example, pattern matching.

When the text recognizer 408 determines that the interim text 406 does not include a trigger, the text recognizer outputs the interim text as recognized text 410. The recognized text 410 may be stored, used by a subsequent process, or transmitted back to the user. As mentioned above, the recognized text 410 is eventually normalized from true text.

When the text recognizer 408 determines that the interim text 406 does include a trigger, the text recognizer (or an associated processor) sends a command 412 to the speech recognizer 402. The command 412 causes the speech recognizer 402 to pause the recognition of audio 404. The command 412 further causes the speech recognizer 402 (or an associated processor) to fetch the speech resource to which the trigger is linked and load, invoke, or activate the identified speech resource. Once the identified speech resource is loaded, invoked, or active, the speech recognizer 402 continues transcribing audio 404 to interim text 406 until the text recognizer 408 identifies the next trigger. Of course, the audio 404 may not contain any triggers in which case the loaded resources are used for the remaining or entire transcription.

As can be appreciated, the text recognizer 408 recognizers a trigger subsequent to the speech recognizer generating the interim text 406. Thus, when the trigger is recognized from the interim text, a text tag 407 is identified, which text tag 407 may be associated with endpointing metadata. In other words, the text tag 407 is the next word or utterance subsequent to the end of the trigger utterance or the end of the trigger itself. In certain applications, the beginning of the trigger may be a component of the final text product as well. The associated or correlated audio marker 403 is identified and the audio from that point is re-input to the speech recognizer 402 for conversion to interim text 406 using the identified speech resource, which speech resource may be referred to as the second speech resource, the subsequent speech resource, or the new speech resource. If the trigger is to be part of the recognized text 410, the text recognizer 408 may be inhibited from any particular trigger two times (2x) in succession. For example, if the text recognizer identified "trigger A", "trigger A", "trigger B", the recognized text 410 would be TRIGGER A as the second input of interim text 406 of trigger A would not initiate a speech resource switch.

Similarly, the interim text 406 that may have been generated prior to the pausing of the audio is deleted or overwritten. Thus, the interim text 406 subsequent to the text tag 407 is deleted prior to the audio being restarted for processing using the second speech resource. Deleting may simply mean overwriting or the like.

Figure 5:
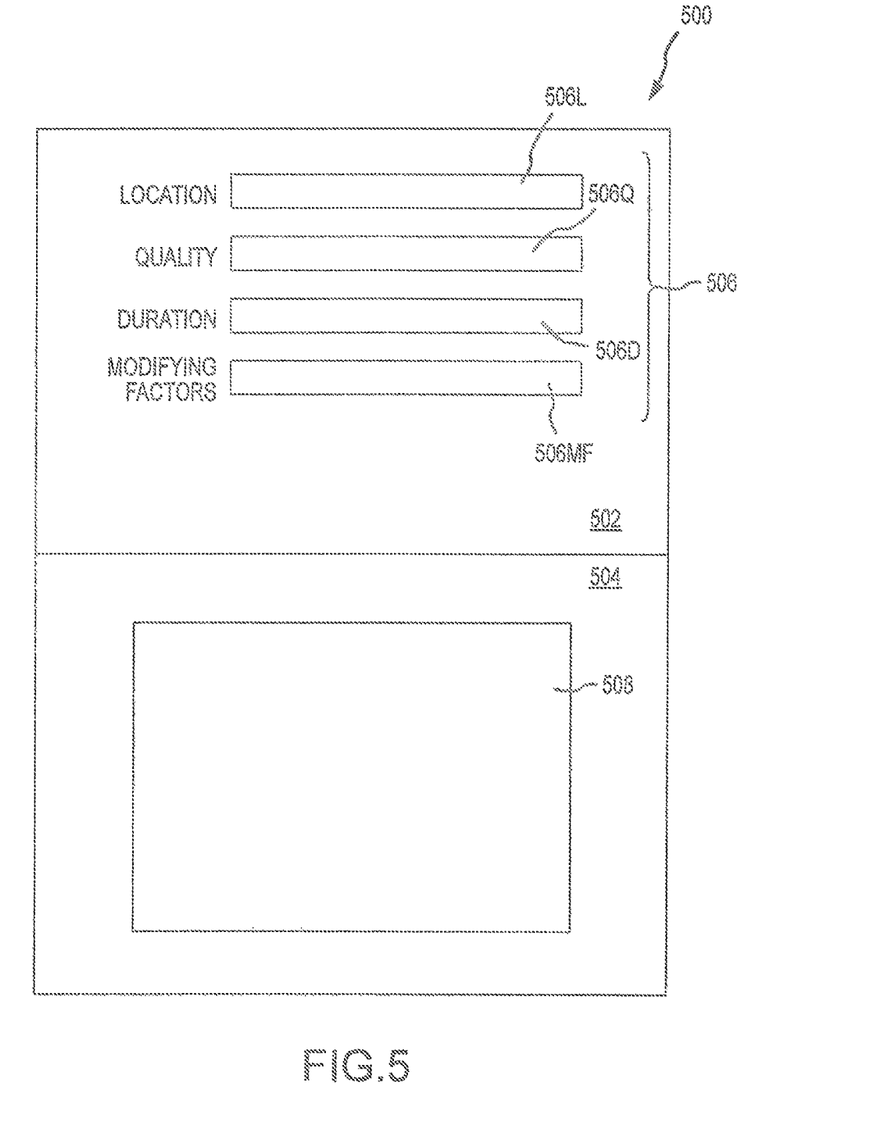
FIG. 5 is a diagram of a graphical user interface usable with the technology of the present application.

With reference to FIG. 5, the above technology will be described with reference to an exemplary electronic health record. FIG. 5 only shows part of an exemplary graphical user interface (GUI) 500 for entry of information at a client station 102. For purposes of the present example, the GUI 500 displayed on a monitor or screen is divided at about the centerline into a structure data entry portion 502 and an unstructured data entry portion 504. In the structured data entry portion 502, the GUI 500 may have, for example, a plurality of data entry windows 506. The data entry windows may be labeled for identification. For example, data entry window $506_L$ is for the location of the condition or symptom. Similarly, data entry window $506_Q$ may be labeled Quality, data entry window $506_D$ may be labeled Duration, and data entry window $506_{MF}$ may be labeled Modifying Factors. For increased accuracy and efficiency, the back office speech recognition system may load a speech resource to convert audio files to text files tailored to the type of information expected to be entered in the various data entry windows 506. Thus, as the healthcare provider, or other user, moves a cursor from one active window (e.g., the data entry window), the back office speech recognition system may load, invoke or activate a specific speech resource. U.S. patent application Ser. No. 13/495,406 titled Apparatus and Methods for Managing Resources for a System Using Voice Recognition, filed Jun. 13, 2012, and incorporated herein by reference as if set out in full describes changing language models as the user positions a cursor.

With reference to the unstructured portion 504 of the GUI 500, however, the healthcare provider would place the cursor in the data entry window 508. The back office speech recognition system would be provided with a general or initial speech resource to convert audio to text (among other resources). The initial speech resource may be, for example, the speech resource associated with the Location data entry window $506_L$ as the Location information is expected to be the initial dictation. However, the initial speech resource may be a more generic speech resource for the case where the healthcare provider neglects to use the triggers as defined above. As the healthcare provider dictates, the provider would enunciate the trigger for the item to be input. For example, after placing the cursor in window 508, the healthcare provider would enunciate the location of the symptom, such as, by for example, stating: "LOCATION chest cavity" and the back office speech recognition system would, as explained above, first convert the audio to interim text. The text recognizer would next recognize the trigger word LOCATION and pause the audio to either (1) confirm the LOCATION speech resource among other resources are operating or (2) load the LOCATION speech resource and resources necessary to the speech recognizer. If (1) confirmed, the process continues with the loaded speech resource. If (2) loaded, the process continues subsequent to the replacement of the previous or first speech resource with the subsequent or second speech resource. The system would next convert the audio of chest cavity to interim text and recognized text as chest cavity is not a trigger. The provider would next say, for example, "DURATION one minute and fifty six seconds." The speech recognizer would generate the interim text that the text recognizer would recognize as a trigger causing the audio to pause while the speech recognizer switched from the LOCATION resources to the DURATION resources. Once switched, the system would generate text of 1 minute and 56 seconds (normalized). Notice the normalization may occur as part of generating the interim text 406 or as part of generating the recognized text 410. In some aspects, the trigger may be included in the transcribed text and in others the trigger may not be included.

While specifically referencing a speech resource, other portions of the audio system may be dynamically changed by the trigger. For example, in a customer service center, a customer service request may be transferred from the agent to the supervisor. The supervisor on receipt of the call may state "Supervisor Smith Product X" such that the resources for supervisor Smith and the speech resource associated with Product X is loaded and activated.

In still other embodiments, the phonetics associated with the user may change as well as other of the resources used for dictation. For example, the user may in some instance need to switch languages, such as from English to Spanish. With reference to a lawyer, for example, the lawyer may have a dictation system for obtaining incoming information about a new client. The intake may be initially be designed for American English (in the United States of America), but the lawyer may have an opportunity to represent a Spanish only speaking client. The intake may use a trigger such as Espanol or Spanish, which may cause a change in the speech resources such that the phonetics associated speech are better recognized with the speech recognition.

As can be appreciated, tailoring the resources closely to the speech recognition tends to increase the accuracy of the recognizer and decrease the recognizer's dependency on how the user pronounces words. One added benefit is the applicability to use more relatively less expensive speech recognition engines in areas that may otherwise require a very expensive speech recognition engine to process a type of speech that would be applicable over an entire field. This is particularly relevant in the medial, engineering, accounting, or scientific fields as a recognition engine to promptly process a speech designed to cover broad swaths of the language used in the very precise, complex, and technical fields would be prohibitive in many applications.

While described with specific reference to a speech recognition system, the technology of the present application relates to changing commands and responses by the processor as well. For example, while the above examples relate to dictation/transcription where an acoustic model maps sounds into phonemes and a lexicon that maps the phonemes to words coupled with a language model that turns the words into sentences, with the associated grammar models (such as syntax, capitalization, tense, etc.), other resources may be used. In some aspects of the technology, for example, the system may allow for inserts of "boiler plate" or common phrases. The inserts may require an audio trigger, a keystroke trigger, or a command entry to trigger the boiler plate insertion into the document. Other aspects may provide for a navigation tool where a trigger is associated with a unique resource locator, which URLs could be associated with a private or public network. Still other aspects may provide for other scripts, macros, application execution, or the like by pairing the commands with trigger audio, keystrokes, or commands similar to the above.

Figure 6:
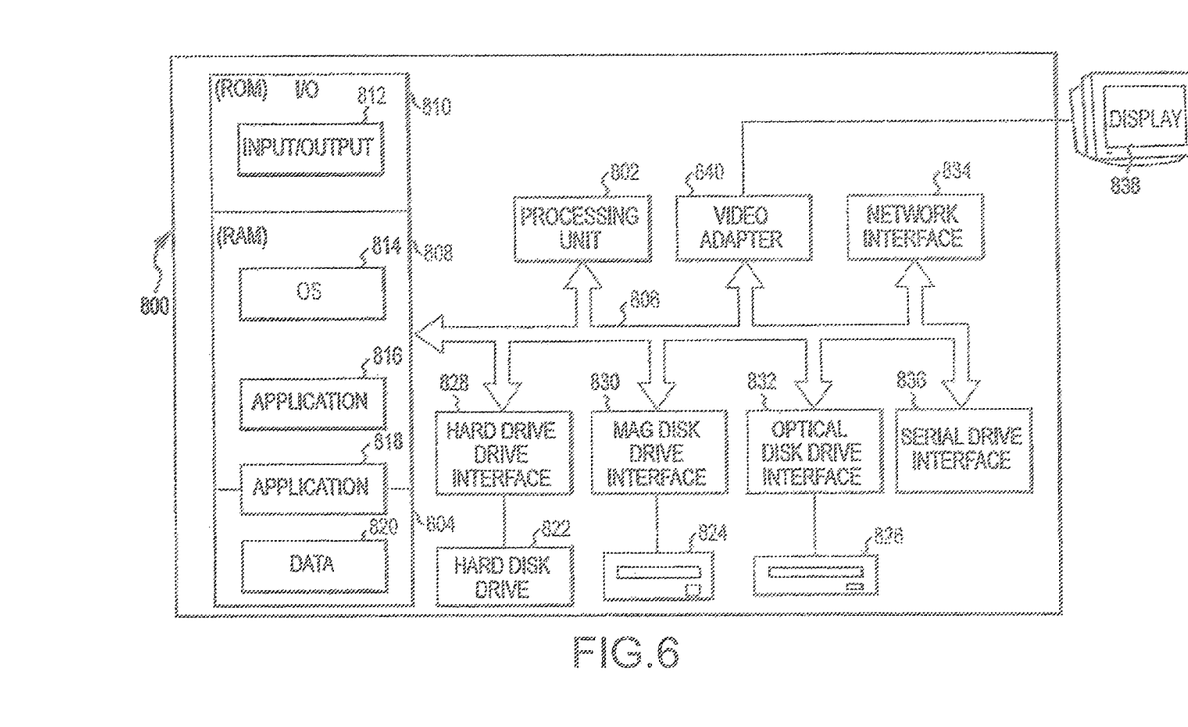
FIG. 6 is functional block diagram of a workstation of FIG. 1 consistent with the technology of the present application.

Referring now to FIG. 6, a functional block diagram of a typical client station 102, dictation manager 104, or dictation server 110 is shown generically as computer 800. The computer 800 is shown as a single, contained unit, such as, for example, a desktop, laptop, handheld, or mobile processor, but computer 800 may comprise portions that are remote and connectable via network connection such as via a LAN, a WAN, a WLAN, a WiFi Network, Internet, or the like. Generally, computer 800 includes a processor 802 (such as a central processing unit, a field programmable gate array, a chipset, or the like), a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Computer 800 generally includes one or more of a hard disk drive 822 (which also includes flash drives, thumb drives, zip sticks, solid state drives, etc., as well as other volatile and non-volatile memory configurations), a magnetic disk drive 824, or an optical disk drive 826. The drives also may include flash drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). The computer 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Computer 800 also may have USB ports or wireless components, not shown. Computer 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be non-transitorily implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

I claim:

1. A method performed on at least one processor for managing speech resources of a speech recognition engine, the method comprising the steps of:
   (a) initiating a speech recognition engine with a first speech resource configured to convert an audio file to an interim text file;
   (b) converting an audio file received by the speech recognition engine to interim text using the first speech resource and correlating the audio and the interim text;
   (c) determining that the interim text matches at least one trigger; and
   (d) pausing (b) the converting step and replacing the first speech resource configured to convert the audio file to the interim text file with a second speech resource configured to convert the audio file to the interim text file based on the interim text matching the at least one trigger, wherein the pausing step includes rewinding a portion of the audio based on the correlation between the audio and the interim text and deleting the interim text corresponding to the rewound portion of the audio; and (e) once the second speech resource has replaced the first speech resource, continue converting the audio file by the speech recognition engine to interim text using the second speech resource.

2. The method of claim 1 wherein correlating the audio and the text comprises creating a plurality of small audio files from the audio and converting the plurality of small audio files into a corresponding plurality of interim text files and wherein outputted recognized text is concatenated from the plurality of interim text files.

3. The method of claim 1 wherein correlating the audio and the text comprises placing a plurality of markers in the audio and placing a corresponding plurality of tags in the text such that the markers and tags provide audio and text pairs.

4. The method of claim 1 wherein the at least one trigger is linked to the second speech resource.

5. The method of claim 4 wherein the at least one trigger comprises a plurality of triggers and wherein the second speech resource comprises a plurality of speech resources.

6. The method of claim 1 wherein the at least one trigger is selected from a group of triggers consisting of: a word, a clause, a phrase, or a combination thereof.

7. The method of claim 1 wherein the first speech resource comprises at least a first language model and the second speech resource comprises at least a second language model.

8. A processor comprising a speech recognition engine comprising:

a speech recognizer, executing on the processor, the speech recognizer to receive audio and convert audio to interim text using at least a speech resource configured to convert the audio to the interim text, wherein received audio and the interim text are correlated; and a text recognizer, executing on the processor and operationally coupled to the speech recognizer, the text recognizer to receive the interim text and recognize whether the interim text contains a trigger;

wherein the text recognizer recognizes a trigger in the interim text and causes the speech recognizer to pause conversion of the audio to interim text and replaces a current speech resource with a replacement speech resource, rewind a portion of the received audio based on the correlation between the received audio and the interim text, and delete a portion of the interim text that corresponds to the rewound received audio, and subsequently continues conversion of the audio to interim text.

9. The processor comprising a speech recognition engine of claim 8 further comprising a memory wherein the memory comprises a plurality of triggers and a plurality of speech resources configured to convert audio to interim text wherein each of the plurality of triggers is linked to one of the plurality of speech resources.

10. The processor comprising a speech recognition engine of claim 9 wherein the interim text comprises a plurality of interim text files and the speech recognizer converts the audio into a plurality of audio files corresponding to the plurality of interim text files.

11. The processor comprising a speech recognition engine of claim 10 further comprising an index engine wherein the index engine correlates the plurality of audio files and the corresponding plurality of interim text files.

12. The processor comprising a speech recognition engine of claim of claim 8 wherein the speech resource configured to convert the audio to the interim text comprises at least a language model.

13. The processor comprising a speech recognition engine of claim 12 wherein the replacement speech resource comprises at least a second language model.

14. A method performed on at least one processor for managing speech resources of a speech recognition engine, the method comprising the steps of:

initiating a speech recognition engine with a first language model;

converting audio received by the speech recognition engine to interim text;

determine that the interim text matches at least one trigger; and on matching the interim text to the at least one trigger, pausing the converting audio step, replacing the first language model with a second language model, rewinding a portion of the received audio based on a correlation between the received audio and the interim text, and deleting a portion of the interim text corresponding to the rewound audio, and subsequently resuming the converting audio step using the second language model.

* * * * *